United States Patent
Bak et al.

(10) Patent No.: US 8,533,449 B2
(45) Date of Patent: Sep. 10, 2013

(54) MULTI-PHASE RESUME FROM HIBERNATE

(75) Inventors: Yevgeniy M. Bak, Redmond, WA (US);
Kirsten V. Stark, Redmond, WA (US);
Mehmet Iyigun, Kirkland, WA (US);
Emily N. Wilson, Seattle, WA (US);
Andrew D. Rogers, Bellevue, WA (US);
James A. Schwartz, Jr., Seattle, WA (US); Nicholas Stephen Judge, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 163 days.

(21) Appl. No.: 13/037,272

(22) Filed: Feb. 28, 2011

(65) Prior Publication Data

US 2012/0221875 A1 Aug. 30, 2012

Related U.S. Application Data

(63) Continuation of application No. 13/034,480, filed on Feb. 24, 2011.

(51) Int. Cl.
*G06F 9/00* (2006.01)

(52) U.S. Cl.
USPC .................................. 713/2; 713/1; 713/300

(58) Field of Classification Search
USPC .................. 713/1, 2, 100, 300, 320, 323, 324
See application file for complete search history.

(56) References Cited

U.S. PATENT DOCUMENTS

| | | | |
|---|---|---|---|
| 6,101,601 A | 8/2000 | Matthews et al. | |
| 6,611,919 B1 * | 8/2003 | Matsuya et al. | 713/320 |
| 6,851,065 B2 | 2/2005 | Lo et al. | |
| 7,100,040 B2 | 8/2006 | Fortin et al. | |
| 7,793,127 B2 | 9/2010 | Gu et al. | |

(Continued)

FOREIGN PATENT DOCUMENTS

| | | |
|---|---|---|
| KR | 1019970029082 A | 6/1997 |
| KR | 1019970071232 A | 11/1997 |
| WO | 2007040806 A1 | 4/2007 |

OTHER PUBLICATIONS

Ensuring Application Compatibility with System Sleep and Display Power Management, Jun. 16, 2010, http://download.microsoft.com/download/3/0/2/3027D574-C433-412A-A8B6-5E0A75D5B237/Science-Sleep.docx.

(Continued)

*Primary Examiner* — Paul Yanchus, III
(74) *Attorney, Agent, or Firm* — Stolowitz Ford Cowger LLP

(57) ABSTRACT

Resume of a computing device from hibernation may be performed in multiple phases. Each phase may partially restore a state of the computing device to an operational state and may establish an environment in which another phase of the resume is performed. The hibernation information may be partitioned to store separately data to be used at each resume phase. The information may be stored in a compressed form. In a first phase, a boot-level resume loader may restore a portion of the operating system based on a portion of the hibernation information. The restored portion may be used in a second phase to retrieve hibernation information from another portion through the operating system (OS). Multiple processors supported by the OS may read and decompress the hibernation information that is then moved back to operational memory. The operating system may support asynchronous disk input/output or other functions that accelerate the resume process.

20 Claims, 7 Drawing Sheets

(56) References Cited

U.S. PATENT DOCUMENTS

| | | | |
|---|---|---|---|
| 2002/0191692 A1* | 12/2002 | Fallon et al. | 375/240 |
| 2007/0061556 A1* | 3/2007 | Rothman et al. | 713/1 |
| 2009/0172439 A1 | 7/2009 | Cooper et al. | |
| 2009/0327608 A1 | 12/2009 | Eschmann et al. | |
| 2010/0058007 A1* | 3/2010 | Yamauchi | 711/156 |
| 2011/0107020 A1* | 5/2011 | Duan | 711/104 |

OTHER PUBLICATIONS

Kernel Enhancements for Windows XP, Jan. 13, 2003, http://www.microsoft.com/whdc/archive/XP_kernel.mspx.

"International Search Report", Mailed Date: Dec. 27, 2012, Application No. PCT/US2012/025987, Filed Date: Feb. 22, 2012, pp. 9.

* cited by examiner

MULTI-PHASE RESUME FROM HIBERNATE

CROSS-REFERENCE TO RELATED APPLICATION

This Application is a continuation of U.S. application Ser. No. 13/034,480, entitled "MULTI-PHASE RESUME FROM HIBERNATE," filed on Feb. 24, 2011, which is herein incorporated by reference in its entirety.

BACKGROUND

Computers have several operating modes, ranging from full operation to full shutdown. In full operation, software defining the executing portions of the operating system has been loaded from non-volatile memory into operational memory, which is conventionally volatile memory, from which it can more quickly be executed. The computer enters this full operation mode though a "startup" process. The startup process configures the hardware and loads the operating system of the computer. As part of the startup process, drivers are installed and operating system services are started.

Once the computer is ready for operation by any user, a user may log on to the computer. This log on may involve further configuration of the computer based on a profile specific to the user who is logged on. Either automatically or in response to user input, applications may then be loaded, such that the applications can execute, taking advantage of the capabilities of the hardware and operating system services of the computing device.

In the process of loading software, whether for the operating system or applications, memory may be allocated, parameters of the software may be assigned values based on the hardware configuration of the computer or a user profile, and other configuration actions may be performed. These actions establish a "state" of the computing device. Further changes to the memory and other parameters of the system that define its operating state may also be made as the user provides commands to interact with executing applications or operating system services.

In full shutdown mode, power is not supplied to the hardware components of the computer. No software or state information is stored in volatile memory, as this memory does not retain information when it is powered off. Rather, any information that will be used later to re-configure the computer for a full operation mode is stored in non-volatile memory.

The computer enters shutdown mode through a process called shutdown. During shutdown, any information that may be needed to re-configure the computer, if it is not already stored in non-volatile memory, may be stored in non-volatile memory. Software and other configuration information that was copied into volatile memory from non-volatile memory is not copied back to non-volatile memory, because it can be re-created upon a subsequent startup process.

In addition to a full shutdown, there may be power saving modes in which power to some or all of the hardware components of the computer is turned off. In a power saving mode, sometime called sleep mode, power is turned off for the computer processor, network interfaces and possibly other components. However, power is retained for volatile memory. In this way, any state information created during boot or subsequent operation of the computer is retained in volatile memory. When power is supplied to the processor again, it may resume operation in the state where it left off upon entering sleep mode.

A further mode is sometimes called hibernate mode. The computer enters this mode through a process called hibernation. During hibernation, a file capturing the operating state of the computer is created and stored in non-volatile memory, typically a hard disk. Data representing the state of the system may be compressed as it is stored in the hibernation file. During a process of resuming from hibernate, this file may be read from the disk, decompressed and used to re-establish the state of the computer as it existed at the time of hibernation. Resuming from hibernate restores in volatile memory copies of software or parameters set during operation that existed at the time of hibernating, such that any user state is also restored.

Resuming from hibernation can be faster than performing a full startup for several reasons. One reason is that copying the state information in the hibernation file into volatile memory re-creates the results of the full startup process, while avoiding the time spent executing the steps of the startup process, such as CPU consumption, device initialization and many other types of work that has to be done during boot. Additionally, the information accessed during startup is stored in many different files, representing different components that are accessed to load and configure what may be potentially tens of thousands of components in the operating system. These components, and the information accessed to configure them, may be randomly distributed across the hard disk. Because hard disk drives, and some other forms of high capacity storage, are most efficient at accessing sequential data, accessing randomly distributed data may include substantial disk access time, leading to a long startup process. In contrast, the access time is less in reading the hibernation file because information in that file may be stored sequentially on the disk.

SUMMARY

To increase the speed at which a computing device resumes from a hibernation mode, the computing device may be configured to resume from the hibernation mode in multiple phases. Each phase may partially restore the state of the computing device based on hibernation information. The phases may be performed in different environments such that different resources of the computing device are used in different phases. In some embodiments, processing during a phase may establish an environment in which another phase of the resume is performed.

In some embodiments, a phase of the resume processing may be performed by execution of a first set of computer-executable instructions. These instructions may be executed in a pre-operating system environment. For example, the instructions may constitute a boot loader that is part of a BIOS of the computing device or may otherwise be in firmware of the computing device. These instructions may control the transfer of a first portion of hibernation information stored in non-volatile memory into operational memory. The first environment may be a relatively sparse environment as is conventional in a pre-operating system environment. The first set of instructions may be executed on a single processor and may not support asynchronous access to the storage medium containing the hibernation information.

Execution of the first set of computer-executable instructions may establish a second environment in which the second set of computer executable instructions may be executed to control the transfer of a second portion of the hibernation information from non-volatile memory into the operational memory. The second environment may have a richer set of resources.

The second environment, for example, may include support for multiple processors. More than one processor may be used to perform processing in the second phase to share the processing load required to complete the resume from hibernation. For example, one or more of the processors may read hibernation information and make it available for processing by one or more other processors. These read operations may be performed synchronously. Other processors may decompress the data and transfer it as appropriate to operational memory.

Alternatively or additionally, the richer set of resources may include memory access functionality that allows asynchronous access to the storage medium containing the hibernation information. For example, the second environment may support asynchronous disk input/output (I/O) as is conventional in an operating system environment. Even if the computing device has a single processor, using asynchronous access may speed up the resume, because the processor may perform processing to restore the state of the computing device based on a segment of the hibernation information during an interval while an I/O operation is pending to read another segment of hibernation information from non-volatile storage.

To implement the resume from hibernation in multiple phases, information from operational memory that will be restored during each resume phase may be recorded separately. This information may be stored in conjunction with metadata identifying information to be restored in each phase. In some embodiments, the hibernation information may be partitioned such that information recorded for each preceding phase, when moved back to operational memory, establishes an environment for a subsequent phase. In some embodiments information restored in a first phase recreates a portion of an operating system that is sufficient to complete the resume process through the operating system. These portions of the operating system may include portions of the kernel of the operating system that support hardware access and a kernel mode resume loader.

Some or all of the hibernation information may be recorded in a compressed form. In some embodiments, one or more suitable compression algorithms may be dynamically selected, based on capabilities of processors and disk I/O of the computing device. For example, a compression algorithm may be selected based on a number and processing speed of the processors and based on the I/O speed of the disks in a computing device. A compression algorithm may be selected based on criteria that favors use of more compression when more processing power is available. The criteria also may favor more compression when access times to the disk or other non-volatile memory storing hibernation information is slower. Metadata stored with the hibernation information may include values of parameters indicating characteristics of the compression used.

According to one aspect, a method of operating a computing device comprising at least one processor may be implemented. The method may comprise dynamically selecting at least one compression algorithm and, at a time of hibernation, recording in a first portion of hibernation information in non-volatile memory, the first portion comprising information from operational memory representing a state of the computing device at the time of hibernation, and recording in a second portion of the hibernation information in the non-volatile memory, the second portion comprising information from the operational memory representing the state of the computing device at the time of hibernation. The first portion and/or the second portion may be compressed according to a dynamically selected compression algorithm of the at least one dynamically selected compression algorithm such that the first portion and the second portion have different amounts of compression.

According to another aspect, a computer system may be provided comprising a volatile storage medium and a non-volatile storage medium comprising hibernation information. The hibernation information may comprise a first portion storing first information indicating a portion of a state of the computer system at hibernation, the first information being compressed with a first compression algorithm, and a second portion storing second information on a state of the system at the time of hibernation, the second information being compressed with a second compression algorithm. The hibernation information may further comprise header information identifying at least the second portion and the second compression algorithm.

According to a yet further aspect, a method of operating a computing device may be provided that comprises compressing with at least one compression algorithm at least one of first information comprising information from operational memory used to restore a portion of an operating system of the computing device and second information comprising information from the operational memory on a state of the computing device at the time of hibernation, recording in a first portion of hibernation information in non-volatile memory the first information, recording in a second portion of the hibernation information in the non-volatile memory the second information, and recording in metadata associated with the hibernation information at least one value identifying at least one parameter of the at least one compression algorithm.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
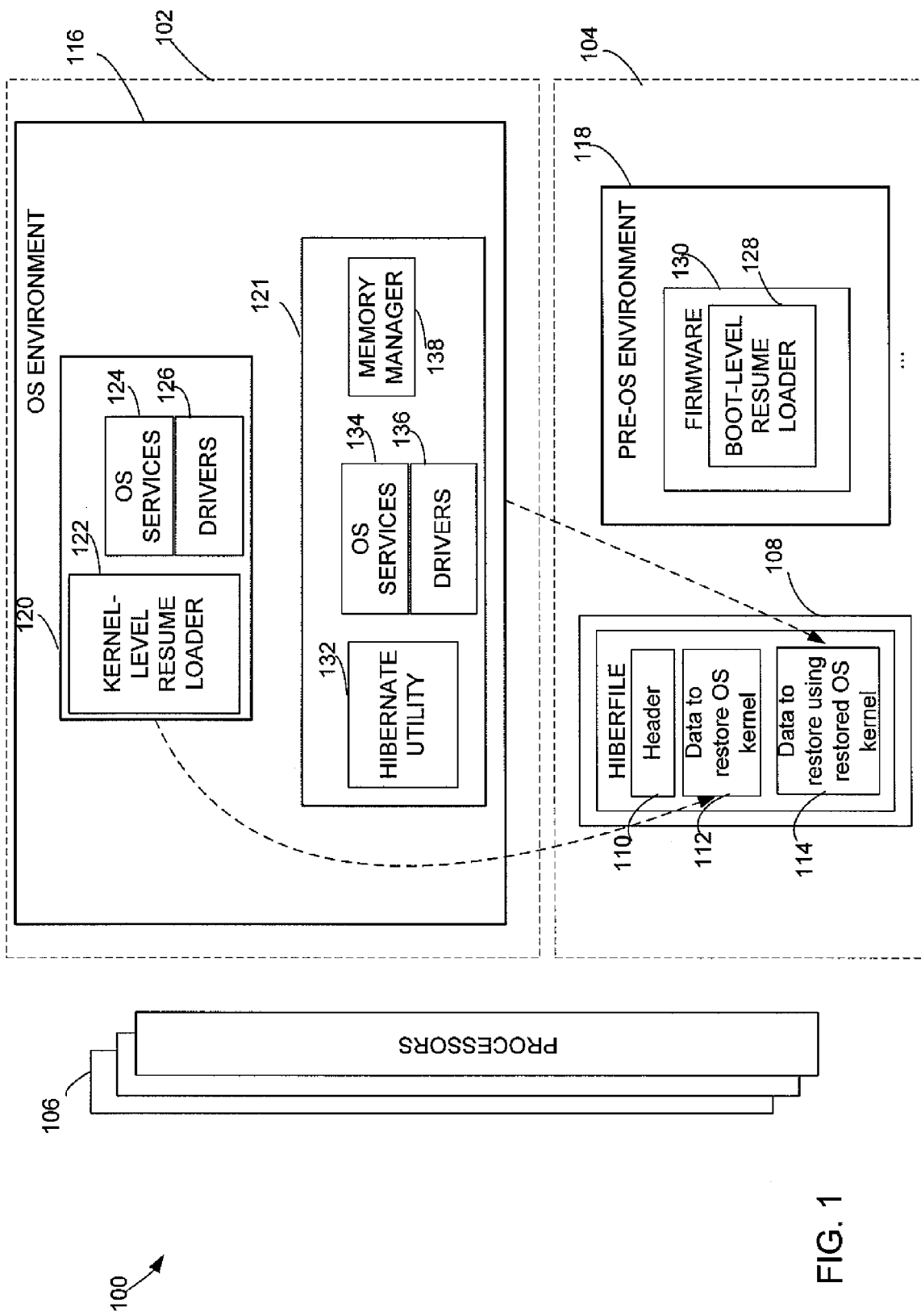
FIG. 1 is a conceptual block diagram illustrating a system in which some embodiments of the invention may be implemented.

Applicants have recognized and appreciated that conventional resume from hibernation that involves restoring a state of a computing device under control of boot firmware of the computing device may not utilize processing resources of the computing device efficiently. The computing device may have multiple processors. However, the boot firmware may not support multiple processors. Moreover, boot firmware does not conventionally support asynchronous I/O. Accordingly, available resources of the computing device may be underutilized, which may limit the speed at which the computing device resumes from a hibernation mode.

Applicants have recognized and appreciated that, to increase the speed at which a computing device resumes from a hibernation mode, the computing device may be configured to resume from the hibernation mode in multiple phases. Each resume phase may partially restore the state of the computing device from hibernation information, with each subsequent resume phase restoring additional state information. Moreover, each resume phase may establish an environment in which a successive phase may execute. As a result, the resume phases may be performed in different environments such that different resources of the computing device are used in different phases to quickly complete the resume operation.

In some embodiments, a phase of the resume from hibernate processing may be performed by execution of a first set of computer-executable instructions. For example, the instructions may constitute a boot loader that is part of a BIOS of the computing device or may otherwise be in firmware of the computing device. These instructions may control the transfer of a first portion of hibernation information stored in non-volatile memory into operational memory.

These instructions may be executed in a first environment. The first environment may be a relatively sparse environment, such as a pre-operating system environment. For example, the first set of instructions may be executed on a single processor that does not support asynchronous access to the storage medium containing the hibernation information.

Execution of the first set of computer-executable instructions may establish a second environment in which the second set of computer executable instructions may be executed. The second set of computer executable instructions may control the transfer of a second portion of the hibernation information from non-volatile memory into the operational memory. As a specific example, execution of the boot-level loader in the pre-operating system environment may result in resuming a kernel-level loader in the operating system. The kernel-level loader may control transfer of hibernation information into the volatile memory using resources provided through the operating system, such as multi-processor support or asynchronous I/O support.

The second environment may have a richer set of resources than the first environment. When the operating system environment provides support for multiple processors, for example, more than one processor may be used to perform processing in the second phase to share the processing load required to complete the resume from hibernation. One or more of the processors may read hibernation information from the non-volatile storage and make it available for processing by one or more other processors. For example, such one or more of the processors may transfer the hibernation information into a shared buffer in volatile memory. Other processors may access the shared buffer and decompress the information, if it was stored in the compressed form. The decompressed information may then be transferred back into an appropriate location in the operational memory. In some embodiments, the one or more processors that read the hibernation information from non-volatile memory may use synchronous I/O operations. Yet the resume process may nonetheless proceed quickly because other processors may concurrently process the information and transfer it to operational memory.

The richer operating system environment may also include support for memory access functionality that allows asynchronous access to the storage medium containing the hibernation information, which may also speed up the resume operation, regardless of the number of processors available. For example, the operating system environment may support asynchronous disk input/output (I/O). Accordingly, a processor may transfer hibernation information from the non-volatile memory into a storage medium acting as a buffer from which it can be accessed for processing to restore state information based on the hibernation information. The processing may be performed by other processors or may be performed by the same processor that reads the information while asynchronous read operations are pending. Accordingly, even if the computing device has a single processor, using asynchronous access may speed up the resume.

As another example, when asynchronous I/O is supported, parameters of the asynchronous I/O operations may be set to speed up the resume operation. For example, a second environment may support multiple I/O operations pending concurrently. The number of such concurrently pending operations may be configurable, and a number of such operations may be specified as part of configuring the computing device to operate in the second environment. Moreover, a parameter controlling the size of each I/O operation may also be set as part of establishing the second environment. These parameters may be set dynamically, based on the hardware on the computing device, or in any suitable way.

In some embodiments, to implement the resume from hibernation in multiple phases, information from operational memory that will be restored during each resume phase may be recorded separately. Any suitable technique may be used to determine which information from operational memory to store for use in each phase. In some embodiments, the hibernation information may be dynamically determined during a hibernation sequence based on a state of the computing device. For example, the utilities within a computer operating system that manage storing of hibernation information may be programmed with a list of components of the operating system that are to be restored for use after a first phase. The hibernate utility may identify, in memory management structures maintained by the operating system, memory pages used by those components. Those memory pages may be stored as part of the portion of the hibernation information associated with the first phase.

The hibernation information may be stored in any suitable way to allow the portions of the hibernation information appropriate for each phase to be identified by the resume loader for that phase. For example, the hibernation information may be stored in conjunction with metadata identifying information to be restored in each phase of the multi-phase resume. In embodiments in which the hibernation information is stored as a hibernation file, a header of the file may store the metadata. Though, other implementations may be substituted.

In some embodiments, some or all of the hibernation information may be recorded in a compressed form. In some embodiments, a suitable compression algorithm may be dynamically selected, based on capabilities of processors and disk I/O of the computing device. For example, a compression algorithm may be selected based on a number and processing speed of the processors and based on the I/O speed of the disks in a computing device.

In some embodiments, a compression algorithm may be selected based on criteria that favors use of more compression when more processing power is available. A compression algorithm with a higher degree of compression may also be selected when access times to the disk or other non-volatile memory storing hibernation information is slower.

In some embodiments, because different phases of the resume are performed in different environments, different compression algorithms may yield different performance benefits in different phases. Thus, different compression algorithms may be selected to compress hibernation information for different phases, based on resources available to the computing device at a respective resume phase.

Metadata stored with the hibernation information may include values of parameters indicating characteristics of the compression used. These parameters may be accessed during resume from hibernation. Thus, during the resume, different decompression algorithms may be selected based on the metadata. As a result, different algorithms may be used to decompress portions of the hibernation information based on corresponding compression algorithms selected to compress the hibernation information.

Turning now to FIG. 1, a functional block diagram of a computing device 100 that may be adapted to operate according to embodiments of the invention is illustrated. In this example, computing device 100 includes volatile memory 102. Volatile memory 102 may be implemented using DRAM or any other suitable memory components. Computing device 100 also includes non-volatile memory 104 which may be implemented using any suitable memory components.

Any suitable physical devices may be used to implement non-volatile memory 104. For example, non-volatile memory 104 may be a disk, such as a spinning hard disk or a solid state drive.

Computing device 100 may include any other components as are known in the art. These components may include multiple processors 106. Each of processors 106 may be implemented as a separate physical chip or other device, as are known in the art. Though, in some embodiments, each processor may be a core of a multicore device. It should be appreciated that computing device 100 may comprise any other suitable components that are omitted for simplicity. Techniques described herein allow utilizing more than one of processors 106 during at least portion of a resume from hibernation process.

Volatile memory 102 may be an example of operational memory. In operation, volatile memory 102 may store information used to operate the computer system. The information may include executable code, data used by that code and/or other state information.

Techniques described herein implement a resume of computing device 100 from hibernation so that the speed at which the computing device resumes from the hibernation is increased. When computing device 100 enters a hibernation mode, the device may perform a hibernation sequence, which includes storing hibernation information to be later used to resume from hibernation. This hibernation information may be stored in non-volatile memory 104. In some embodiments, the hibernation information may be stored in a file 108, referred to as a hiberfile, in non-volatile memory 104. Though, it should be appreciated that embodiments of the invention are not limited to a manner in which the hibernation information is stored in non-volatile memory 104 and the hibernation information may be stored in any suitable storage medium. The specific type of non-volatile memory is not important, but could be a sequential access a disk, such as a hard disk or solid state disk.

In some embodiments, resume from hibernation may be performed in multiple phases. Here, two resume phases are illustrated by way of example only. It should be appreciated that resume from hibernation may be performed via more than two phases, with information restored at each phase used to establish an environment for a subsequent phase. Information to be restored at each phase may be stored in a separate location within hibernation information stored in non-volatile memory.

Each phase may partially restore the computing device to establish an environment in which another phase of the resume may be performed. The resume from hibernation may be divided into phases in any suitable manner.

To resume from hibernation via multiple phases, hibernation information may be partitioned into sections. Each section may have recorded thereon information for a respective phase that, when moved back to the operational memory, establishes an environment for a subsequent phase.

Accordingly, different portions of hiberfile 108 may store information required for different phases of resume from hibernation. In the example illustrated, hiberfile 108 may comprise a header 110, a first portion 112 and a second portion 114. Each of portions 112 and 114 may store hibernation information that is transferred to operational memory during a respective phase of a resume from hibernation. It should be appreciated that portions 112 and 114 of hiberfile 108 are shown in FIG. 1 by way of example only and any other suitable organization of hibernation information in non-volatile memory 104 may be used to store hibernation information. Moreover, this information may be stored in more than two portions, as the resume from hibernation process may comprise more than two phases.

Any suitable technique may be used to identify information stored to be later used for a respective resume phase. In some embodiments, locations of the different portions of the hibernation information identifying the content of the operational memory may be recorded as metadata—for example, in header 110 of hibernation file 108. This metadata may alternately or additionally contain other information used in a resume from hibernation such as an identification of a compression algorithm applied to compress one or more portions of the hibernation information.

First portion 112 of hiberfile 110 may comprise information used to restore a portion of the operating system of the computing device during a first phase. In some embodiments, this portion of the operating system may comprise a portion of a kernel of the operating system. Second portion 114 may comprise information used to complete restoring a state of computing device 100 at the time of entering the hibernation mode. Header 110 may comprise information identifying first portion 112 and second portion 114.

The operating system may provide an environment 116 having richer resources as compared to a boot firmware pre-operating system environment 118. Thus, in some embodiments, the pre-operating system environment may restore only the hibernation information that is sufficient to partially restore the operating system. The restored portion may establish an operating system environment in which a larger part of the resume process then may be performed. Accordingly, an amount of hibernation information that is to be moved to operational memory during the first phase may be smaller than amount of hibernation information to be moved to the operational memory during the second phase. As a result, only state information sufficient to partially restore a kernel of the operating system may be stored in portion 112 of hibernation file 108 that is restored in the first phase. The rest of the state information that is later used to completely restore the computing device from the hibernation is stored in portion 114 of hiberfile 108.

FIG. 1 shows schematically that state information on components executed within operating system environment 116 may be partitioned into two parts, labeled as 120 and 121, respectively, each of which may be stored separately in hiberfile 108 to be restored in a respective resume phase. Thus, state information 120 may be stored in portion 112 of hiberfile 108, which is restored during the first resume phase. State information 120 may comprise code to implement a kernel-level resume loader 122, some operating system services 124 and drivers 126. Drivers 126 may control hardware components that operate during the second resume phase and may comprise, for example, one or more drivers for communication with disk hardware, drivers for a crash-dump stack, Advanced Configuration and Power Interface (ACPI) drivers and others. Information on any other suitable components may be stored in portion 112 of hiberfile 108.

In some embodiments, information stored in first portion 112 of hiberfile 108 may be returned to active memory during a resume by a boot-level resume loader 128 stored in firmware 130 of pre-operating system environment 118. The boot loader 128 may control partial resume of computing device 100 from hibernation to enable operation of kernel-level resume loader 122 in operating system environment 116.

As shown in FIG. 1, state information 121 may be stored in portion 114 of hiberfile 108. This information, when moved back to the operational memory during a second resume phase, may be used to complete the resume process. While information 120 on a state of computing device 100 at a time of hibernation is partially stored in portion 112, state information 121 may be implemented using technology as is known in the art. It may transfer state information from active memory to non-volatile storage and then trigger shut down of power to the computing device using techniques as in a conventional computing device. The state information may be transferred in segments, such as memory pages as defined by memory manager 138. Each page may be compressed before being stored. Moreover, each segment may be tagged or in some way identified so that upon resume from hibernate, the segment can be returned to the same memory location in active memory from which it was copied. All of these operations may be performed using conventional techniques or any other suitable techniques. However, hibernate utility 132 may differ from a conventional utility in that it transfers state information from active memory to non-volatile memory in a way that supports a multi-phase resume. To support these operations, hibernate utility 132 may identify those segments of active memory storing state information to be restored in each phase and store that information in an appropriate format in hiberfile 108. In some embodiments, hibernate utility may add information to the hiberfile to support multi-phase resume. As one example, hibernate utility 132 may add information on how to invoke a loader for a subsequent phase. Alternatively or additionally, rather than have loader 122 in active memory at a time of hibernate, utility 132 may add it to the hiberfile 108.

Instructions stored in portion 114 of hiberfile 108 may comprise hibernate utility 132. Hibernate utility 132 controls transfer of hibernation information stored in portion 114 of hiberfile 108 to volatile memory 102 during the second resume phase. Hibernate utility 132 may comprise kernel-level resume loader 122 enabled in the first phase that may execute to load the instructions stored in portion 114 of hiberfile 108 to volatile memory 102.

State information 121 may comprise any suitable information on a state of computing device 100 at a time of hibernation that is to be restored during the resume. State information 121 may comprise operating system services 134, drivers 136, memory manager 138 and any other components not shown for the sake of simplicity. Drivers 136 may control hardware components. Memory manager 138 may be an example of operating system services 134 and may organize information in volatile memory 102. Any other suitable services provided by the operating system (e.g., interacting with a user interface and establishing a network connection) may be implemented and the specific operating system services 134 is not a limitation on the invention.

In some embodiments, information stored in first portion 112 and information stored in second portion 114 of hiberfile 108 may be compressed prior to being stored. A different compression algorithm may be selected to compress information stored in each of the portions 112 and 114. In such embodiments, header 110 may include metadata comprising values of parameters indicating characteristics of the compression algorithms used for hiberfile 108 or each of one or more portions of the file.

In some embodiments, hibernate utility 132 may select a compression algorithm for information in one or more portions of the hibernate information. Suitable compression algorithms may be dynamically selected based on a number of criteria, including characteristics of an environment in which the information will be decompressed. Thus, a first compression algorithm to compress information stored in first portion 112 of hiberfile 108 may be dynamically selected based on capabilities of at least one component of computing device 100 to be used to access portion 112 to store this information in the operational memory. To compress information stored in second portion 114 of hiberfile 108, a second compression algorithm may be dynamically selected based on at least one of disk input (I/O) speed and capabilities of processors 106 of computing device 100 to be used to access second portion 114 to store the information from this portion in the operational memory.

It should be appreciated that, in some embodiments, only information stored in first portion 112 of hiberfile 108 or only information stored in second portion 114 hiberfile 108 may be stored in a compressed form.

Figure 2:
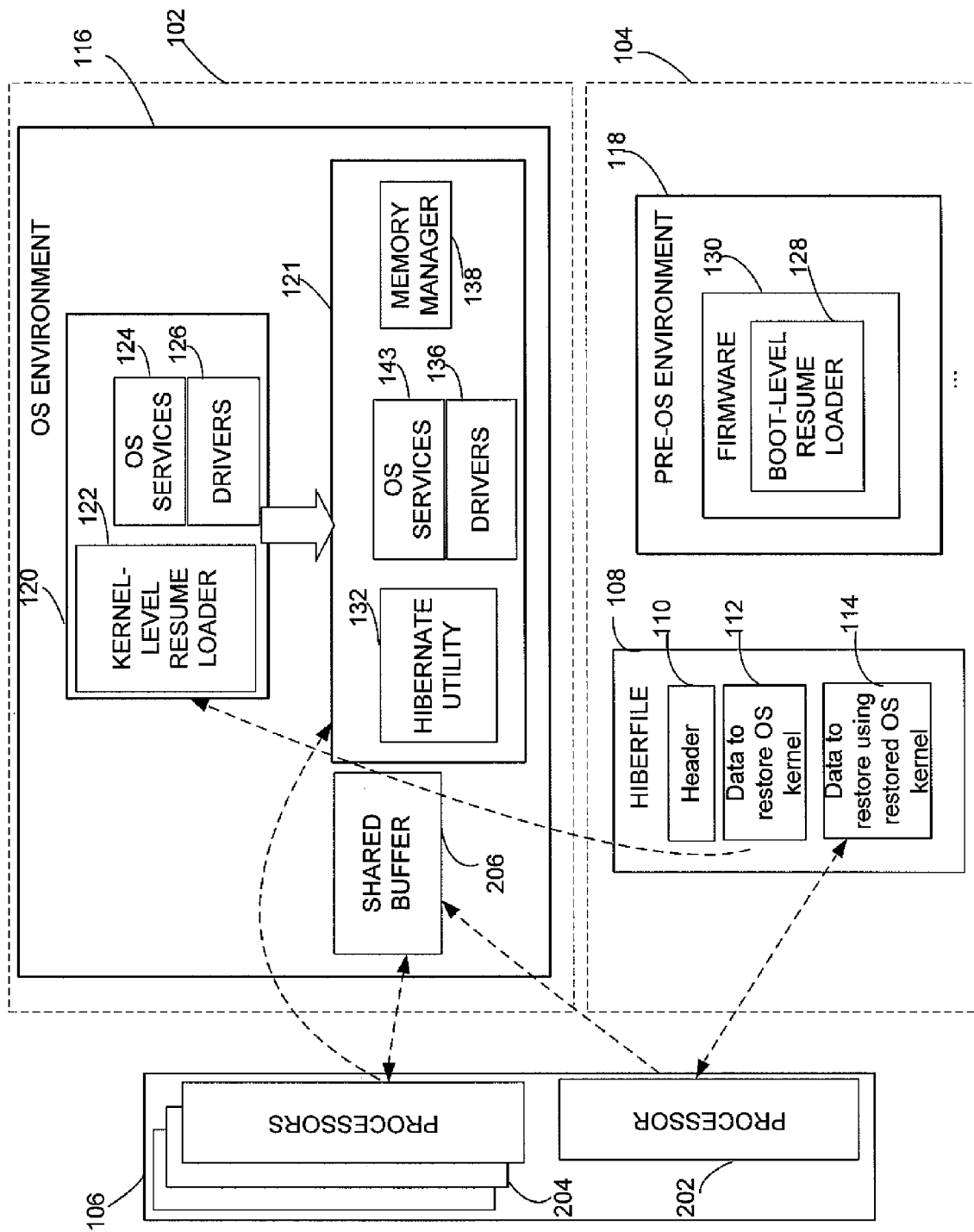
FIG. 2 is a functional block diagram illustrating a resume from hibernation sequence in a computing device, according to some embodiments of the invention.

Hibernation information stored in hiberfile 108 or other suitable storage in non-volatile memory 104 may be used to resume computing device 100 from hibernation. FIG. 2 illustrates computing device 100 during a resume from hibernation sequence in accordance with some embodiments. Computing device shown in FIG. 2 includes components similar to those shown in FIG. 1.

In some embodiments, resume from hibernation is performed in multiple resume phases. As discussed in connection with FIG. 1, information (e.g., state information 120 and state information 121) from operational memory that will be restored during each resume phase may be recorded separately in hibernation information stored in non-volatile memory. In the example illustrated, hibernation information may be stored in hibernation file 108 stored in non-volatile memory 104. Hiberfile 108 comprises first portion 112 storing information that may be restored in a first resume phase and second portion 114 storing information that may be restored in a second resume phase. The hibernation information may be stored in conjunction with metadata identifying information to be restored in each phase.

In the example illustrated, metadata in hiberfile 108 may be used to identify information to be restored in each resume phase. The metadata may be stored, for example, in header 110 of hiberfile 108. Though, it should be appreciated that hibernation information to be processed in different respective resume phases may be identified in any suitable way, including by using predetermined addresses to indicate portions for each phase or pointers at the end of a portion identifying a portion for a subsequent phase.

Resume from hibernation sequence may begin by accessing instructions stored in boot firmware 130. Those instructions cause a processor, such as, for example, processor 202 of processors 106 to access hibernation file 108. In this example, upon accessing hibernation file 108, processor 202 copies a portion of content of hibernation file 108 into operational memory (e.g., volatile memory 102). For example, the instructions may cause processor 202 to read information from portion 112 of hiberfile 108 to enable boot-level resume loader 128.

Hibernation information stored in first portion 112 of hiberfile 108 may comprise information used to recreate, in a first resume phase, a portion of an operating system that is sufficient to complete the resume process in a second phase through the operating system. In the example illustrated, in the first resume phase, state information 120 stored in first portion 112 of hiberfile 108 may be restored.

The first portion 112 of hiberfile 108 may be returned to active memory by boot-level resume loader 128. The boot loader may be part of a BIOS of computing device 100 or may otherwise be in firmware 130 of the computing device. The boot loader 128 may control the transfer of hibernation information stored in portion 112 of hiberfile 108 into volatile memory 102 using conventional resume from hibernate techniques. Accordingly, boot-level resume loader 128 may execute in a pre-operating system environment 118.

Boot-level resume loader 128 may constitute a first set of computer-executable instructions that are executed during the resume process. Execution of these instructions may restore a portion of a kernel of the operating system, such as kernel-level resume loader 122. The pre-operating system environment 118 in which the first set of the computer-executable instructions is executed may be a relatively sparse environment. For example, boot-level resume loader 128 may not be capable of supporting multiple processors, even if multiple processors are present. Thus, the first set of the instructions may be executed on single processor 202 and may not support asynchronous access to a storage medium containing the hibernation information, such as hiberfile 108. For example, pre-operating system environment 118 does not support asynchronous I/O operations.

Execution of the first set of computer-executable instructions at the first resume phase may establish another environment in which a second set of computer-executable instructions may be executed. The second set of instructions may be executed in operating system environment 116, based on second portion 114 of hiberfile 108. This environment may be different from a full operating system environment because only a portion of the operating system is restored during the preceding phase. A number of components utilized to restore information stored in the hiberfile may execute in this "early" operating system environment, such as components from state information 121 recorded in second portion 114 of hiberfile 108. Execution of the second set of computer-executable instructions in operating system environment 116 may ultimately result in the complete resume of computing device 100 from hibernation.

In the first phase, boot-level loader 128 may control partial resume of computing device 100 from hibernation to enable kernel-level resume loader 122 in operating system environment 116. Boot-level loader 128 may be triggered to operate in response to a resume input from a computer user or other suitable event. Boot-level loader may operate as in a conventional computer system. Though, it may be programmed to transfer control to a loader for the next phase of the resume. In the illustrated embodiment, in the second phase, kernel-level resume loader 122 may control transfer of hibernation information stored in second portion 114 of hiberfile 108 to volatile memory 102. The hibernation information stored in portion 114 may comprise state information 121 preserving a state of computing device 100 at a time of hibernation. Kernel-level resume loader 122 may execute the instructions to complete the resume of computing device 100 from hibernation and to restore the state of computing device 100 at a time of hibernation.

The environment established as a result of execution of the first set of computer-executable instructions, such as operating system environment 116, may have a richer set of resources than pre-operating system environment 118. Thus, operating system environment 116 may include support for multiple processors. Alternatively or additionally, the richer set of resources of operating system environment 116 may include memory access functionality that allows asynchronous access to the storage medium containing the hibernation information, such as hibernation file 108.

Accordingly, more than one processor may be used to perform processing in the second phase to share the processing load required to complete the resume from hibernation. For example, one or more of the processors may read hibernation information and make it available for processing by one or more other processors. These other processors may decompress the hibernation information and transfer it as appropriate to operational memory. This may increase the speed with which computing device may exit the hibernation mode and restore its resources to the full operating state.

The manner in which processors 106 are used to share the processing load for the second phase of the resume is not critical to the invention. In the embodiment shown in FIG. 2, a single processor, such as processor 202, may read second portion 114 of hiberfile 108 and make it available for processing by one or more other processors 204 from processors 106. Processor 202 may read segments, such as pages or groups of pages, from second portion 114 and record the segments in shared buffer 206 in volatile memory 102. When one or more segments of second portion 114 are available in shared buffer 206, the segments may be retrieved by other processors 204. In embodiments where second portion 114 stores hibernation information in a compressed form, upon retrieving the segments from shared buffer 206, processors 204 may decompress the segments and transfer them to an appropriate location in volatile memory 102. A decompression algorithm may be selected based on information on a compression used, which may be determined based on accessed in metadata stored in hiberfile 108 (e.g., in header 110).

The richer set of resources within operating system environment 116 may include memory access functionality that allows concurrent transfer of hibernation information from non-volatile memory into a shared buffer by processor 202 and retrieval from the shared buffer of segments of the hibernation information by processors 204. These richer resources may include support for asynchronous input/output (I/O) operations.

In the illustrated embodiment, processor 202 may access non-volatile memory 104 synchronously. Synchronous access may accelerate reading information from a non-volatile memory device. So long as other processors are available for additional processing to restore the segments to active memory after they have been read from non-volatile memory, the entire resume process may be performed quickly. If multiple processors are available, they may be used in any suitable way to provide a fast resume process. For example, multiple processors may be used to read information from non-volatile memory. Or, some processors may decompress segments and others may copy the decompressed segments into active memory.

It should be appreciated that multiple processors 106 are shown by way of example only as computing device 100 may comprise a single processor. In such scenarios, a single processor may perform both reading the second portion of hibernation information from the non-volatile storage to record segments of the portion in a shared buffer and retrieving the segments from the shared buffer. The processor may read the second portion from the non-volatile storage via an asynchronous input/output (I/O) operation. Thus, even if the computing device has a single processor, using asynchronous access may speed up the resume, because the processor may perform processing to restore the state of the computing device based on a segment of the hibernation information during an interval while an I/O operation is pending to read another segment of hibernation information from non-volatile storage.

Figure 3:
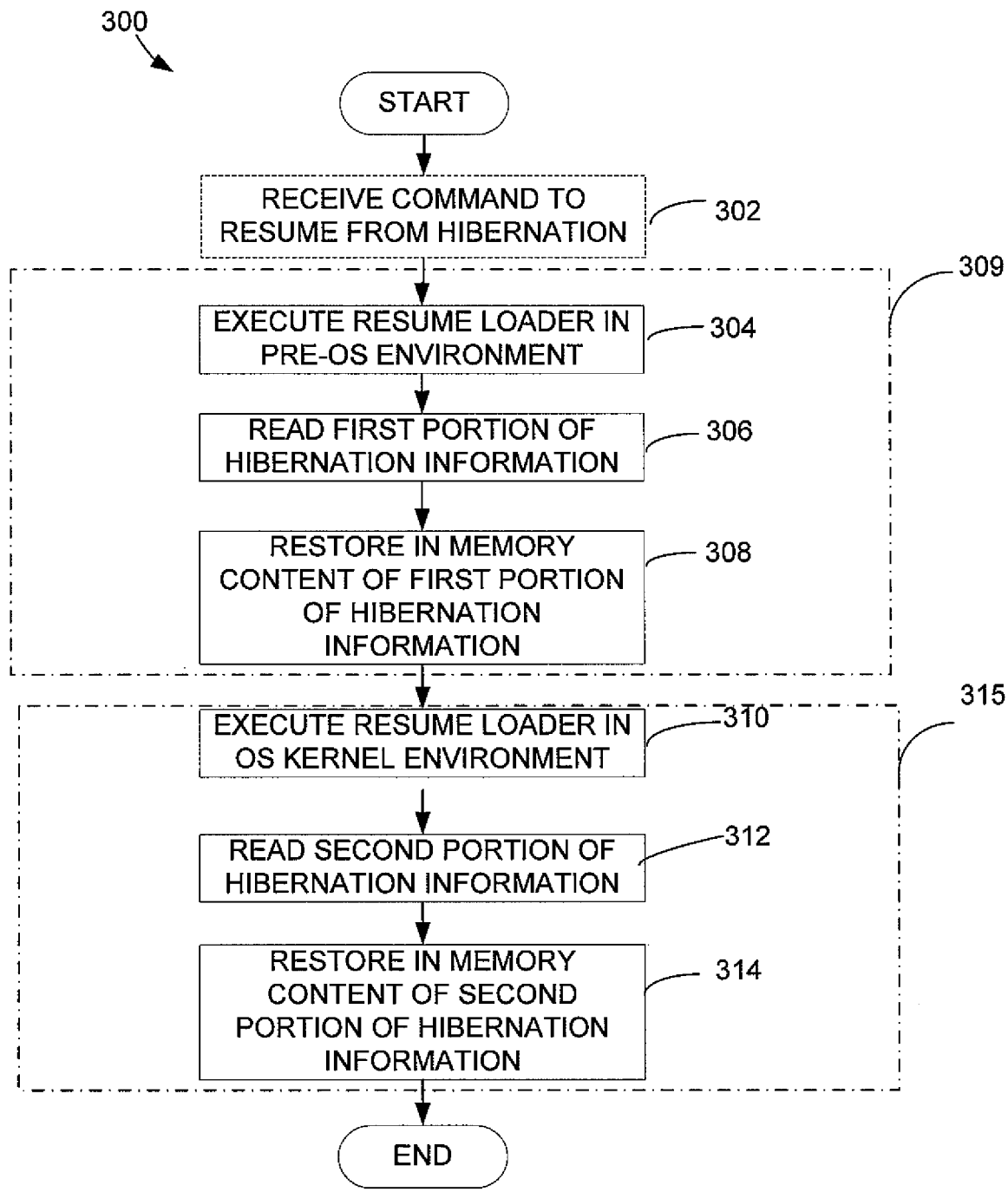
FIG. 3 is flow chart illustrating a method of operating a computing device to resume the computing device from hibernation, according to some embodiments of the invention.

FIG. 3 illustrates a process 300 of resuming a computing device (e.g., computing device 100 in FIGS. 1 and 2) from a hibernation mode. Process 300 may start at any suitable time. For example, process 300 may start in accordance with an event generated by a timer causing the computing device to periodically wake up from hibernation so that the device may be serviced. In other scenarios, process 300 may start upon a command received from a user. Though, any suitable trigger may be utilized to initiate the resume from hibernation process, as embodiments of the invention are not limited in this respect.

At block 302, process 300 is shown to optionally include receiving a command to resume from hibernation. The command may be received in any suitable manner. For example, a user of the computing device may provide input (e.g., via a power button or other input device) to resume the computing device from hibernation. Alternatively or additionally, the resume command may be received from a suitable component of computing device 100.

At block 304, a boot loader in a pre-operating system environment of the computing device may be executed. The boot loader may be a boot-level resume loader (e.g., boot-level resume loader 128 in FIGS. 1 and 2) stored in firmware of the computing device. The boot-level resume loader may control transfer from a non-volatile memory a portion of the hibernation information stored in a suitable location in the non-volatile memory. For example, in some embodiments, the hibernation information may be stored in a component referred to as a hibernation file (e.g., hiberfile 108 in FIGS. 1 and 2). To resume computing device via multiple phases, hiberfile 108 may separately store information to be restored in each resume phase. For example, as shown in FIG. 2, information to be restored in the first phase may be stored in first portion 112 of hiberfile 108. Information to be restored in the second phase may be stored in second portion 114 of hiberfile 108.

Next, at block 306, the first portion of hibernation information (e.g., first portion 112 of hiberfile 108) may be read from the hibernation file. The boot-level resume loader may be executed on the computing device to control transfer of the hibernation information from the non-volatile memory to operating memory of the computing device.

As a result of reading the first portion of the hibernation information from non-volatile memory 104, content of the first portion of the hibernation information may be restored in volatile memory 102, at block 308. The first phase 309 of the resume from hibernation, which encompasses processing at blocks 304-308, may entail restoring a portion of a kernel of the operating system that is sufficient to complete the resume through the operating system.

Accordingly, process 300 may continue to block 310 where the resume loader may be executed in a kernel of the operating system as a kernel-level resume loader (e.g., kernel-level resume loader 122 in FIGS. 1 and 2).

Transfer of control to the kernel-level resume loader may occur in any suitable way. For example, the kernel-level resume loader may be stored in predefined memory locations as a result of partially restoring state in phase 1. The boot-level resume loader may cause a branch to these locations to transfer control. Therefore, other mechanisms may alternatively or additionally be used. For example, the location in active memory of the kernel-level resume loader, after execution of the first phase may be recorded in metadata associated with the hibernation information, and the boot-level loader may be configured to read the metadata and branch to the appropriate location. As yet a further possibility, the boot-level loader may load the kernel-level loader from a source other than the hibernation information and then initiate execution of the kernel-level loader.

The kernel-level resume loader may control reading a second portion of hibernation information from non-volatile memory, at block 312. This information may include information on a state of the computing system at a time of hibernation. Content of the second portion of the hibernation information may be restored in volatile memory 102, at block 314. As a result, the state of the computing system at a time of hibernation may be transferred into volatile memory 102 to thus fully restore the computing device from hibernation. Thus, the second phase 315 of the resume from hibernation that comprises processing at blocks 310-314 may complete the resume from hibernation.

It should be appreciated that, even though the resume from hibernation process in FIG. 3 comprises two phases 309 and 315, a resume from hibernation process in accordance with some embodiments may comprise more than two resume phases. In such scenarios, each of the resume phases may restore and/or establish resources sufficient to further restore a computing device. Such incremental resume from hibernation ultimately results in a complete resume of the computing device.

In some embodiments, a resume phase which completes the resume from hibernation process is implemented in an environment having a richer set of resources. This environment may comprise, for example, an environment of an operating system (e.g., operating system environment 116 in FIGS. 1 and 2). Such environment may provide support for multiple processors that may access hibernation information transferred from non-volatile memory into a suitable storage medium (e.g., shared buffer 206 in FIG. 2). Shared buffer 206 may comprise a memory location that can be accessed by each of the multiple processors participating in restoring content of one or more portions of hibernation information (e.g., stored in second portion 114 of hiberfile 108) in volatile memory.

A single processor (e.g., processor 202 in FIG. 2) may read the second portion of the hibernation information from the non-volatile memory and record the information into a shared buffer via a synchronous disk I/O operation. Other processors (e.g., processors 204 in FIG. 2) may access and retrieve the hibernation information recorded in the shared buffer concurrently with reading the second portion of the hibernation information from the non-volatile memory by the single processor.

To efficiently utilize memory resources, the hibernation information may be stored in non-volatile memory in a compressed form. The multiple processors accessing and retrieving the information recorded in the shared buffer may therefore decompress the retrieved information and move the decompressed information into volatile memory. The retrieving and decompressing the hibernation information from the shared buffer may multiple processors increases the speed at which a target state of the computing device is recreated.

During resume from hibernate, each phase may establish an environment for another phase. For example, a phase comprising restoring a portion of a kernel of an operating system of a computing device may establish an environment, such as an operating system environment, which may have a richer set of resources. Such environment may include support for multiple processor.

Figure 4:
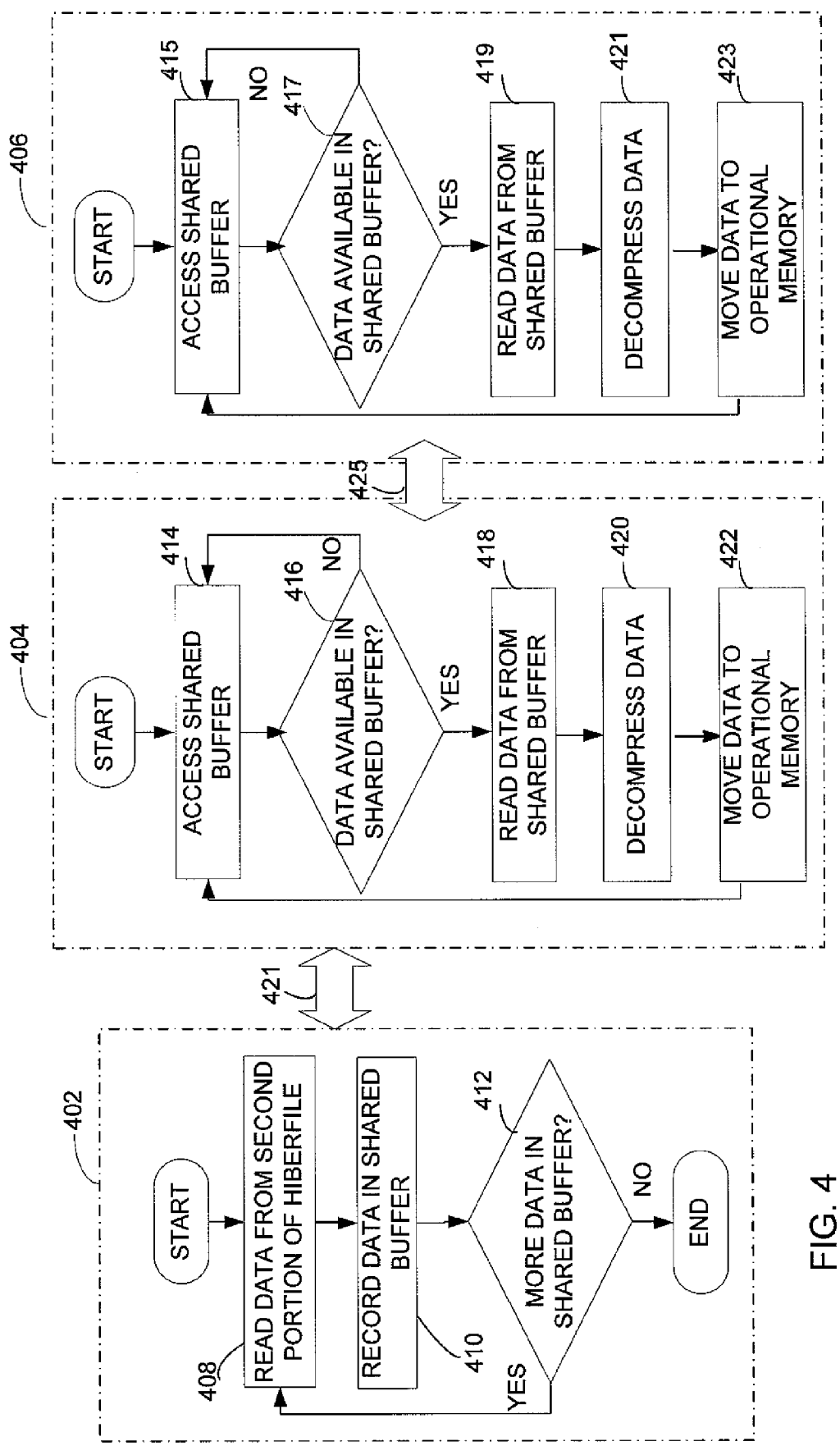
FIG. 4 is a flow chart illustrating reading hibernation information by multiple processors, according to some embodiments of the invention.

FIG. 4 illustrates schematically operation of multiple processors as supported by operating system environment 116 of computing device 100. Block 402 encompasses processing controlled, for example, by a portion of the kernel-level loader 122. Kernel-level resume loader 122 may control transfer of information from a portion of the hibernation file. In the examples illustrated herein, such portion comprises portion 114 of hiberfile 108. In some embodiments, the processing at block 402 may be performed by a single processor, such as processor 202 of multiple processors 106 of the computing device (FIG. 2).

Blocks 404 and 406 each illustrate processing performed by one or more other processor (e.g., processors 204 in FIG. 2) of multiple processors 106. In some embodiments, processing at blocks 404 and 406 may be performed concurrently with processing at block 402.

Processing shown in FIG. 4 may begin at any suitable time. The processing may be initiated as part of a resume from hibernation process, during one of the phases of the resume. For example, it may be initiated upon a completion of a preceding phase of the resume that restores resources of the operating system sufficient to complete the resume.

FIG. 4 illustrates that block 402 may encompass block 408, at which processor 202 may read a segment of the second portion of the hibernation information. The segment may be then recorded in a shared buffer (e.g., shared buffer 206 in FIG. 2), at block 410. Next, at decision block 412, it may be determined whether further hibernation information to be transferred to the shared buffer is available. If it is determined at decision block 412 that the hibernation information is available, the processing at block 402 may branch back to block 408 where another segment of hibernation information may be read from non-volatile storage. If it is determined at decision block 412 that no further hibernation information is available, the processing at block 402 may end. Processor 202 may read segments of the second portion of the hibernation information from the non-volatile storage via synchronous input/output (I/O) operations.

Block 404 comprises processing by a processor of processors 204. The processor may access the shared buffer, at block 414. Next, at decision block 416, the processor may determine whether one or more segments of the second portion of the hibernation information are available in the shared buffer. When it is determined at decision block 416 that at least one segment is available in the shared buffer, indicating that at least a portion of the hibernation information has been recorded in the shared buffer via processing at block 402, the processor may retrieve the segment from the shared buffer.

The retrieved segment may then be decompressed, at block 420. Any suitable component of the computing device may store computer executable instructions that the processor executes to decompress the information. A suitable decompression algorithm may be selected based on a compression algorithm used, as identified in metadata associated with the hibernation information storing values of parameters indicating characteristics of the compression used.

The decompressed information may be transferred into operational memory, at block 422. A location in volatile memory into which the information is transferred may be recorded as metadata along with the information in the hibernation file.

When it is determined when the information is not available in the shared buffer, the processor may return to block 414 where the processor may again access the shared buffer. Such operation, during which the processor may continuously check for the presence of segments of the second portion of the hibernation information in the shared file, may be termed as a busy waiting. As shown in FIG. 4 by an arrow 421, processing at blocks 402 and 404 may be performed concurrently. In such an embodiment, a signaling mechanism may be used to arbitrate which processor will process each segment in the shared buffer. In some embodiments, context switching mechanisms as supported by an operating system for a multi-processor computer may be used. However, in the embodiment illustrated, processing illustrated in FIG. 4 occurs in an environment in which any portions of the operating system have been restored. Accordingly, context switching is not available, and a more simple system, such as semaphores, may be used.

Processing at block 406 comprises blocks 415, 417, 419, 421 and 423 performing the same operations as respective blocks 414, 416, 418, 420 and 422 at block 404. Another processor from processors 204, different from processor performing processing at block 404, may perform processing at block 406. Block 406 is depicted for the purposes of illustrating that multiple processors may concurrently, as shown by an arrow 425, perform accessing the shared file, and, if information is available in the shared file, reading and decompressing the information and then moving it back to the operational memory.

It should be appreciated that different processing may be performed by processors 204 as part of restoring a target state of the computing device during the resume from hibernation.

Figure 5:
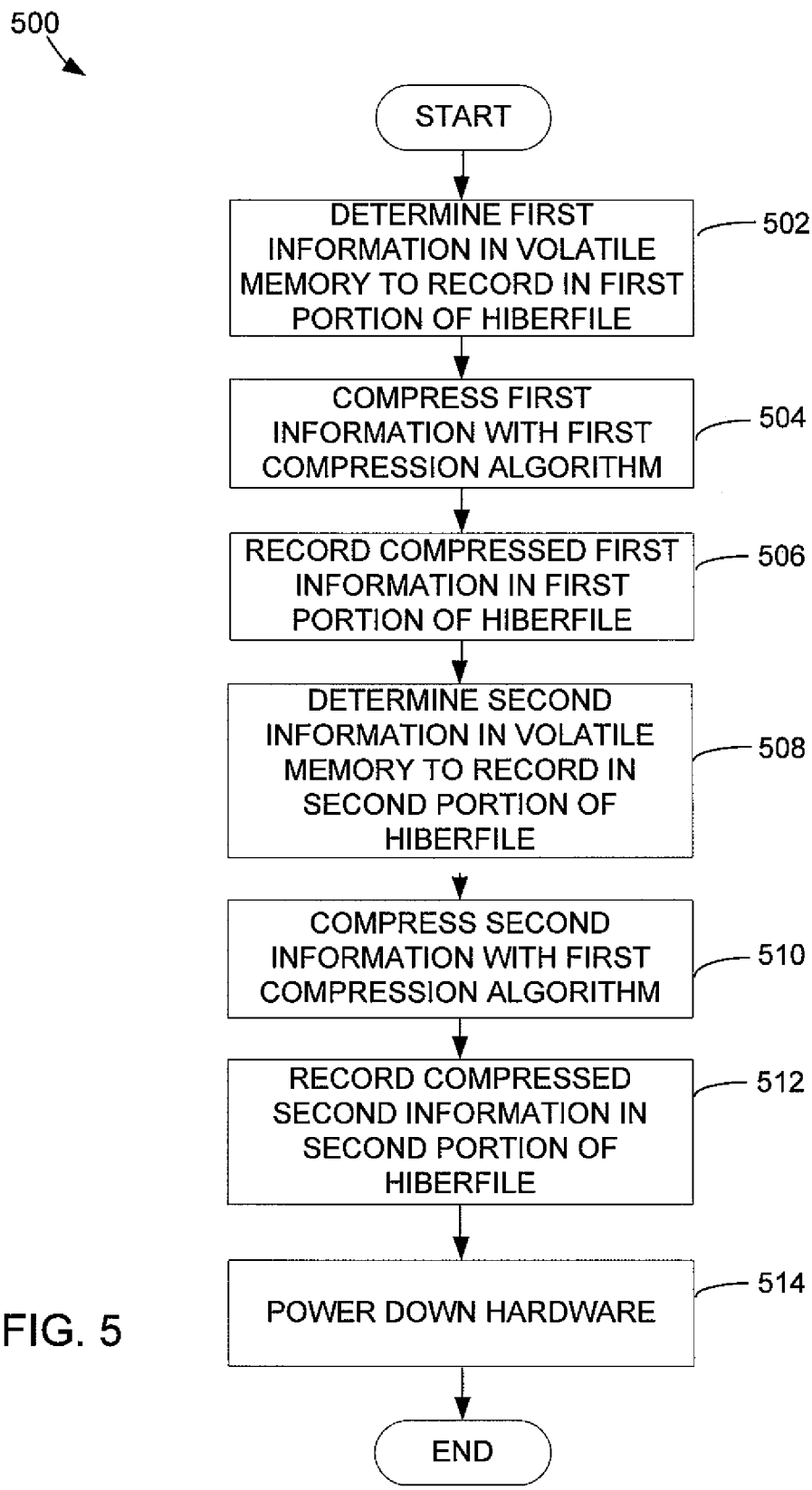
FIG. 5 is a flow chart illustrating a method of operating a computing device to enter hibernation, according to some embodiments of the invention.

FIG. 5 illustrates a process 500 of entering a hibernation mode by a computing device, in accordance with some embodiments of the invention. Process 500 may start at any suitable time. For example, the process may start when a suitable user input is received instructing the computing device to hibernate. Though not shown in FIG. 5, different or additional processing may be performed including processing of the type known in the art. For example, prior to writing hibernation information, a state of each of the processors may be collected (e.g., stack pointers, register counters, etc.) and the state may be stored as part of the metadata for the hibernation information to be restored in the first phase.

In some embodiments, to implement the resume from hibernation in multiple phases, information from operational memory that will be restored during each resume phase may be recorded separately. Thus, the hibernation information may be partitioned such that information recorded for each preceding phase, when moved back to the operational memory, establishes an environment for a subsequent phase.

Regardless of a way in which process 500 is initiated, at block 502, the process may determine first information in volatile memory to record in a first portion of hibernation information, such as a hibernation file (e.g., hiberfile 108 in FIG. 1). Such first information may be, for example, state information 120 in volatile memory 102 (FIG. 1).

The first information may be determined in any suitable manner and may comprise information that will be restored during a first resume phase of the resume from hibernate. The information is selected so that, when moved back to the operational memory during the resume, the information establishes an environment for a subsequent resume phase.

In some embodiments, a state of the computing device at a time of hibernation may be used to determine what information to record for each phase of the resume. In some embodiments, hibernate utility 132 is programmed with information about a set of components of the operating system that are to be restored in order to perform the second phase of the resume process. In that scenario, hibernate utility 132 may identify the first portion by identifying any active memory pages assigned to or in use by those components. Though, any suitable technique may be used to identify the first portion. The information identifying the content may be recorded as metadata—for example, in header 110 of hibernation file 108.

In some embodiments, the first phase of the resume may establish an environment for the second phase. In the examples illustrated in connection with FIGS. 1 and 2, the second phase may be executed in the operating system environment 116 that supports multiple processors. The first resume phase may thus restore a sufficient amount of the state of the processors to enable the processors, during the second phase, to read and decompress the hibernation information.

In some embodiments, the first information in the first portion of the hibernation information may be stored in compressed form. Thus, next, at block 504, the first information determined at block 502 may be compressed using a first compression algorithm. A compression algorithm to compress the first information may be selected dynamically based on capabilities of at least one component of the computing device to be used to access the first portion to store the first information in the operational memory, as also discussed in connection with FIGS. 6A and 6B. Metadata stored with the hibernation information may include values of parameters indicating characteristics of the first compression algorithm.

It should be appreciated that, in some embodiments, the first information may not be stored in the first portion of the hibernation information in a compressed form. In such embodiments, processing at block 504 may be omitted and process 500 may store uncompressed first information in the first portion of the hibernation information.

The compressed first information may be recorded in the first portion of the hiberfile in non-volatile memory, at block 506.

Process 500 may then continue to block 508, where the process may determine second information in volatile memory to record in a second portion of the hibernation information. An example of the second information comprises state information 121 in volatile memory 102 (FIG. 1). The second information recorded in the second portion of the hibernation information may be recorded separately from the first information recorded in the first portion of the hibernation information.

The second information recorded in the second portion of the hibernation information will be restored during a second resume phase, using information restored at the first phase. In this example, the first phase may partially resume the computing device by restoring a portion of a kernel of the operating system. The restored portion of the operating system kernel may later be used, in the second phase, to restore hardware resources and a target state of the computing device in an operating system environment having a richer set of resources.

The second information may be determined at block 508 in any suitable manner, as embodiments of the invention are not limited in this respect. For example, the second information may comprise a state of the computing device at a time of hibernation.

Next, the second information may be compressed, at block 510. A suitable second compression algorithm, which may be selected dynamically, as discussed in connection with FIGS. 6A and 6B. The second compression algorithm may be different from the first compression algorithm used to compress the first information stored in the first portion of the hibernation information. Metadata stored with the hibernation information may include values of parameters indicating characteristics of the second compression algorithm.

The compressed second information may be recorded in the second portion of the hiberfile, at block 512. When the hibernation information is recorded in non-volatile memory, hardware of the computing device may be powered down so that no power is consumed by the hardware as the computing device hibernates. Process 500 may then end.

As discussed above, some or all of the hibernation information may be recorded in non-volatile memory of a computing device in a compressed form. Compressing the hibernation information may decrease a time that it takes to resume the computing device from a hibernation mode. Though, the impact on speed of the resume process may depend on memory access time relative to computation time. Accordingly, compression may be particularly useful in scenarios where the non-volatile memory is slow or substantial processing power is available.

In some embodiments, a suitable compression algorithm may be dynamically selected to compress the hibernation information. A compression algorithm may be selected based on a number of different criteria, such as capabilities of processors and disk I/O of the computing device. For example, a compression algorithm may be selected based on a number and processing speed of the processors and based on the I/O speed of the disks in the computing device.

In some embodiments, more than one portion of the hibernation information to be moved back to operational memory during a respective resume phase may be recorded in a compressed form. In such cases, different compression algorithms may be selected to compress information stored in different portions of the hibernation information. Because different resume phases may be performed in different environments, different resources of the computing device may be used in different phases. Thus, a compression algorithm may be dynamically selected to compress information to be stored in a section in the hibernation information based on resources available to the computing device at a respective resume phase.

Figure 6A:
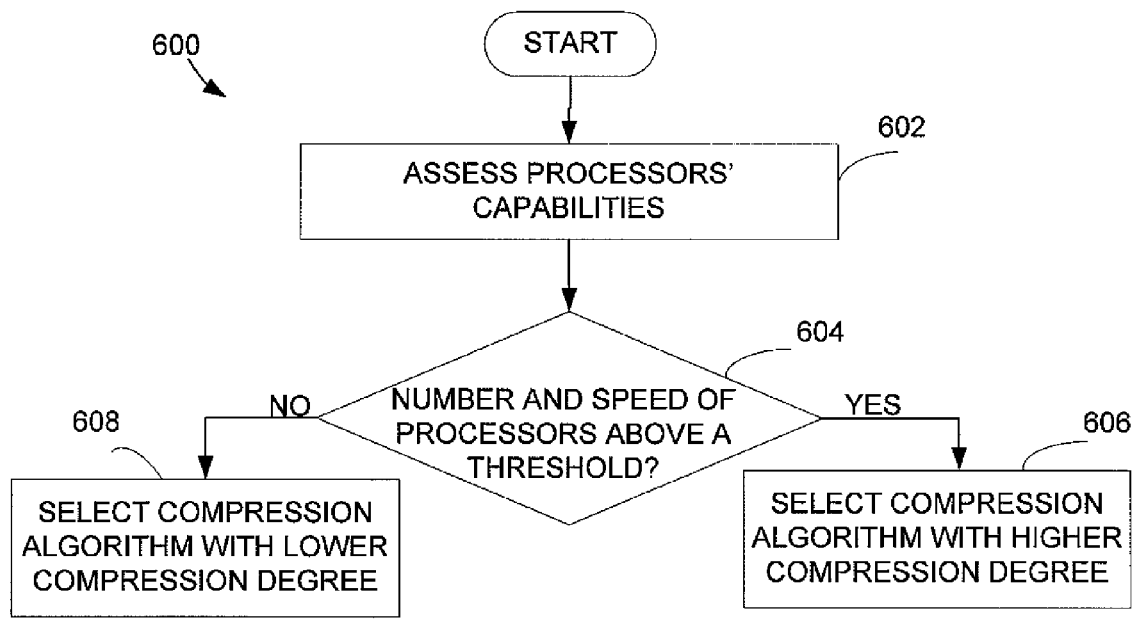
FIGS. 6A and 6B are flow charts of a method of dynamically selecting a compression algorithm to compress hibernation information, according to some embodiments of the invention.

A compression algorithm may be selected based on criteria that use more compression when more processing power is available. The criteria may also favor more compression when access times to the disk or other non-volatile memory storing hibernation information is slower. FIGS. 6A and 6A illustrate two examples of dynamically selecting a compression algorithm in accordance with some embodiments. The compression algorithm may be selected at a time of hibernation, when a suitable component of the computing device (e.g., hibernate utility 132 in FIGS. 1 and 2) determines what information is stored as the hibernation information, how the hibernation information is partitioned and what computing resources are available for use at each phase of resume from hibernation.

FIG. 6A shows that, to select a compression algorithm, capabilities of processors in a computing device may first be assessed, a block 602 of a process 600. Next, at decision block 604, it may be determined whether the number and speed of the processors is above a certain threshold. The threshold may be determined in any suitable manner For example, the operating system may access hardware information to determine what processing power is required in a computing device. It should be appreciated that assessing the number and speed of the processors is shown at block 604 by way of example only. Any suitable performance characteristics of the processors may be evaluated, as embodiments are not limited in this respect.

When it is determined, at decision block 604, that the number and speed of the processors is at or above the threshold, process 600 may branch to block 606 where a compression algorithm with a higher degree of compression may be selected. Alternatively, when it is determined, at decision block 604, that the number and speed of the processors is below the threshold, process 600 may branch to block 608 where a compression algorithm with a lower degree of compression may be selected.

Figure 6B:
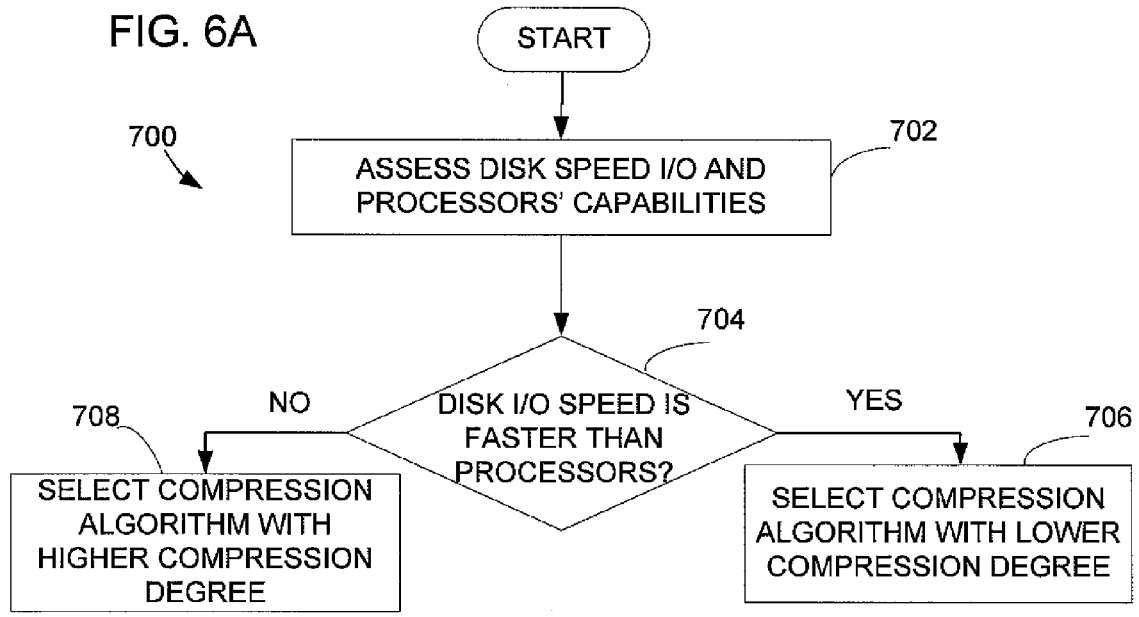

FIG. 6B illustrates another example of a technique for dynamically selecting a compression algorithm in accordance with some embodiments. In this example, a compression algorithm may be selected based capabilities of processors (e.g., on a number and processing speed) and based on the I/O speed of the disks in the computing device.

As shown in FIG. 6B, process 700 may start at block 702 where disk I/O speed and processors' capabilities, such as number and speed of processors or any other suitable processor characteristics) may be assessed. Next, when it is determined, at decision block 704, that the disk speed I/O is faster than that of the processors, process 700 may branch to block 706 where a compression algorithm with a higher degree of compression may be selected. When it is determined, at decision block 704, that the disk speed I/O is not faster than that of the processors, process 700 may branch to block 708 where a compression algorithm with a lower degree of compression may be selected.

In some embodiments, metadata stored with the hibernation information may include values of parameters indicating characteristics of a compression used. Thus, during resume from hibernation, an appropriate decompression algorithm may be selected based on the values of the parameters. Because different compression algorithms may be used for portions of the hibernation information, respective different decompression algorithms may be utilized to decompress the information during resume phases.

It should be appreciated that compression algorithms may be selected based on any suitable criteria as embodiments of the invention are not limited in this respect. For example, amount of information to be compressed may be taken into consideration.

It should be appreciated that FIGS. 6A and 6B illustrate simple approaches for selecting a compression algorithm. In each case, a choice is made between two compression algorithms based on a single criteria. In other embodiments, a selection may be between more than two algorithms based on multiple criteria considered concurrently. For example, for each algorithm that a computing device is configured to use, resume time or resume rate may be computed given the detected hardware of the computing device. The algorithm with the fastest time or rate may be selected.

Figure 7:
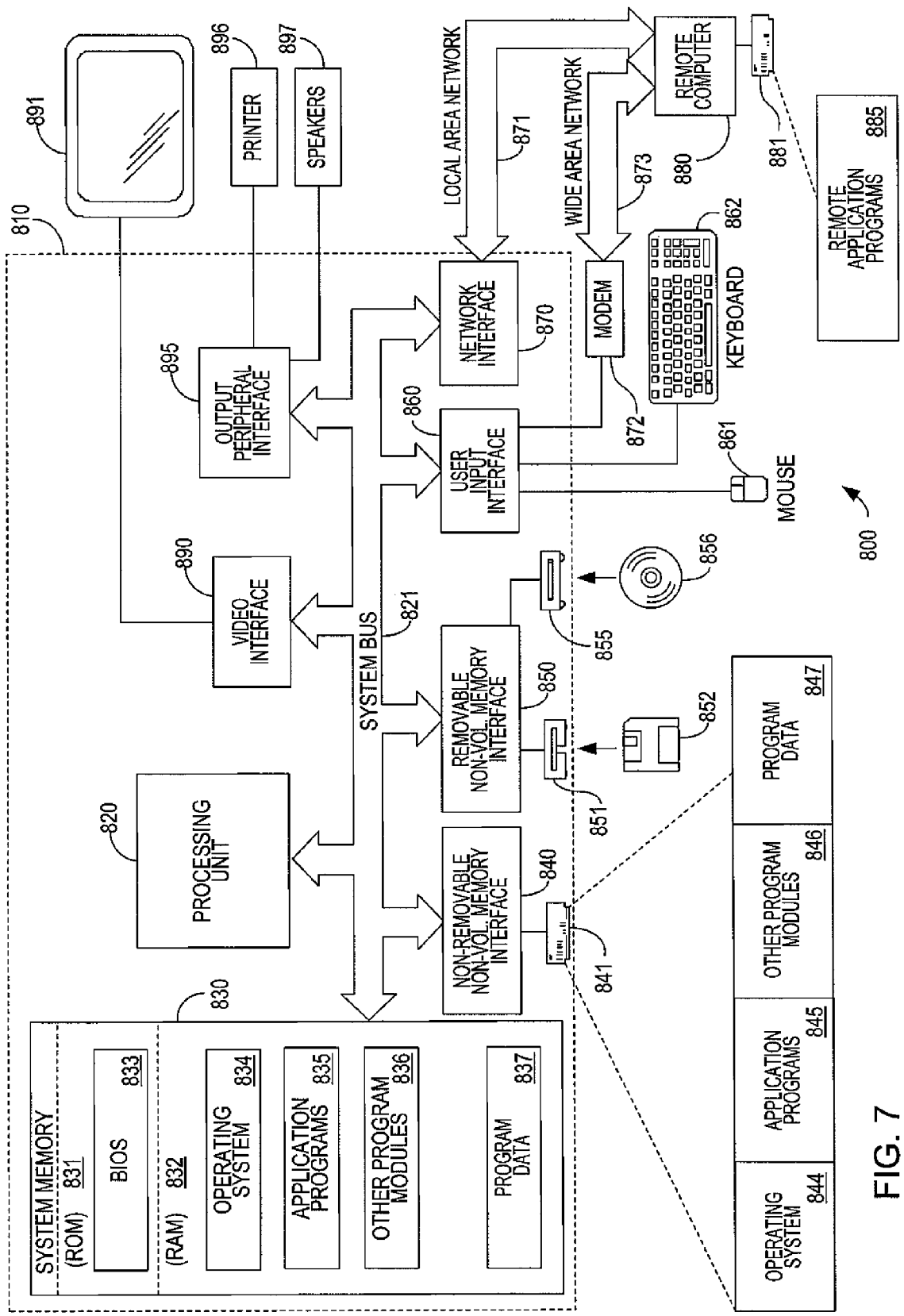
FIG. 7 is a block diagram of an exemplary computing device, illustrating an environment in which some embodiments of the invention may operate.

FIG. 7 illustrates an example of a suitable computing system environment 800 on which the invention may be implemented. The computing system environment 800 is only one example of a suitable computing environment and is not intended to suggest any limitation as to the scope of use or functionality of the invention. Neither should the computing environment 800 be interpreted as having any dependency or requirement relating to any one or combination of components illustrated in the exemplary operating environment 800.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 7 illustrates operating system 834, application programs 835, other program modules 836, and program data 837.

The computer 810 may also include other removable/non-removable, volatile/nonvolatile computer storage media. By way of example only, FIG. 7 illustrates a hard disk drive 840 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Hard disk drive 840 may be implemented as a spinning magnetic medium that contains one or more magnetic heads that can write to or read from the magnetic media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through an non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 7, provide storage of computer readable instructions, data structures, program modules and other data for the computer 810. In FIG. 7, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. A user may enter commands and information into the computer 810 through input devices such as a keyboard 862 and pointing device 861, commonly referred to as a mouse, trackball or touch pad. Other input devices (not shown) may include a microphone, joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 may operate in a networked environment using logical connections to one or more remote computers, such as a remote computer 880. The remote computer 880 may be a personal computer, a server, a router, a network PC, a peer device or other common network node, and typically includes many or all of the elements described above relative to the computer 810, although only a memory storage device 881 has been illustrated in FIG. 7. The logical connections depicted in FIG. 7 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 7 illustrates remote application programs 885 as residing on memory device 881. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, it is described that a computing device in accordance with some embodiments may comprise multiple processors. Because the resume process may complete in the operating system environment supporting multiple processors, utilizing these processors during a resume phase that occurs in the operating system environment may increase the speed with which the computing device resumes from the hibernation. It should be appreciated, however, that the computing device may comprise a single processor. Even in such scenarios, using asynchronous access may speed up the resume, because the processor may perform processing to restore the state of the computing device based on a segment of the hibernation information during an interval while an I/O operation is pending to read another segment of hibernation information from non-volatile storage.

Any suitable technique may be utilized to determine which information to store in each portion of the hibernation information, as embodiments of the invention are not limited in this respect. Furthermore, the embodiments are not limited in respect to a way that is used to determine whether to compress both first and second portion of the hibernation information or only one of the portions. A compression algorithm and a respective decompression technique may be selected in any suitable manner.

It should also be appreciated that, while two phases of the resume from hibernation are described herein, the resume may occur via any suitable number of phases, as embodiments of the invention are not limited in this respect. Each phase may restore the computing device to a point where the next phase may be restored. The resume process may be partitioned into phases in any suitable manner.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device comprising at least one processor, the method comprising:
   dynamically selecting at least one compression algorithm; and
   at a time of hibernation: recording in a first portion of hibernation information in non-volatile memory, the first portion comprising information from operational memory representing a state of the computing device at the time of hibernation; and
   recording in a second portion of the hibernation information in the non-volatile memory, the second portion comprising information from the operational memory representing the state of the computing device at the time of hibernation;
   wherein the first portion and/or the second portion is compressed according to a dynamically selected compression algorithm of the at least one dynamically selected compression algorithm such that the first portion and the second portion have different amounts of compression; and
   wherein dynamically selecting the at least one compression algorithm comprises selecting a compression algorithm for compressing the second portion based on computing resources in a computing environment in which the second portion is to be restored to operational memory during a resume from hibernation.

2. The method of claim 1, further comprising:
   recording header information in association with the hibernation information, the header information identifying at least a compression algorithm used to compress the second portion.

3. The method of claim 1, wherein:
   the first portion comprises information that, when restored to operational memory, establishes a second computing environment in which the second portion is to be restored to the operational memory during a resume from hibernation.

4. The method of claim 3, wherein:
   selecting the compression algorithm for compressing the second portion based on computing resources comprises selecting a compression algorithm based on at least one of disk read speed and capabilities of at least one processor of the computing device in the second computing environment.

5. The method of claim 4, further comprising:
   dynamically selecting a compression algorithm to compress the first portion based on computing resources in a computing environment in which the first portion is to be restored to operational memory during a resume from hibernation.

6. The method of claim 5, further comprising:
   prior to recording the first portion, compressing the first portion with a first compression algorithm selected to compress the first portion; and
   prior to recording the second portion, compressing the second information portion with a second compression algorithm selected to compress the second portion.

7. The method of claim 4, wherein:
   the second computing environment in which the second portion is to be restored to operational memory during a resume from hibernation comprises:
   a first set of processors for reading segments of the second portion from the non-volatile memory and buffering the segments;
   a second set of processors for retrieving the buffered segments and decompressing the segments; and
   selecting a compression algorithm based on a number of processors in the second set.

8. A method of operating a computing device, the method comprising:
   selecting a compression algorithm based on computing resources in a post-hibernate computing environment in which less than all of hibernation information in non-volatile memory is loaded to operational memory;
   compressing with the compression algorithm at least one of first information comprising information from the operational memory used to restore a portion of an operating system of the computing device and second information comprising information from the operational memory on a state of the computing device at the time of hibernation;
   recording in a first portion of the hibernation information in the non-volatile memory the first information; recording in a second portion of the hibernation information in the non-volatile memory the second information; and
   recording in metadata associated with the hibernation information at least one value identifying at least one parameter of the compression algorithm.

9. The method of claim 8, further comprising:
   with computer-executable instructions stored in firmware:
   accessing the first portion of the hibernation information stored in the non-volatile memory;
   storing the first information in the operational memory based on the first portion of the hibernation information; and
   with computer-executable instructions contained within the first information:
   accessing the second portion of the hibernation information stored in the non-volatile memory; and
   storing the second information in the operational memory based on the second portion of the hibernation information.

10. The method of claim 9, further comprising:
    prior to storing the first information in the operational memory and storing the second information in the operational memory, decompressing at least one of the first information and the second information with at least one decompression algorithm selected based on the at least one value identifying the at least one parameter of the at least one compression algorithm.

11. The method of claim 8, wherein compressing with the at least one compression algorithm at least one of the first information and the second information comprises compressing the first information with a first compression algorithm and compressing the second information with a second compression algorithm, the method further comprising:
    dynamically selecting the second compression algorithm based on disk read speed and capabilities of one or more processors of the computing device available to decompress the second portion while restoring the second information in the operational memory.

12. The method of claim 11, wherein the at least one value identifying the at least one parameter of the at least one compression algorithm comprises a value identifying at least one second parameter of the second compression algorithm, the method further comprising:
    prior to restoring the second information in the operational memory based on the second portion of the hibernation information, decompressing the second information with a second decompression algorithm selected based on the second value identifying the at least one second parameter of the second compression algorithm.

13. The method of claim 8, wherein:
accessing the second portion of the hibernation information comprises reading segments of the second portion from the non-volatile memory and buffering the segments; and
storing second information in the operational memory comprises retrieving the buffered segments, wherein:
reading the second portion from the non-volatile memory occurs via synchronous input/output (I/O) operations.

14. The method of claim 8, wherein the computing resources comprise a subset of computing resources that are available in a computing environment corresponding to the state of the computing device at the time of hibernation.

15. A computer system, comprising:
a non-volatile memory;
an operational memory; and
a processing device configured to:
 select a compression algorithm based on computing resources in a post-hibernate computing environment in which less than all of hibernation information in the non-volatile memory is loaded to the operational memory;
 compress, with the compression algorithm, at least one of first information comprising information from the operational memory used to restore a portion of an operating system of the computing environment and second information comprising information from the operational memory on a state of the computing environment at the time of hibernation;
 record the first information in a first portion of the hibernation information in the non-volatile memory;
 record the second information in a second portion of the hibernation information in the non-volatile memory; and
 record in metadata associated with the hibernation information at least one value identifying at least one parameter of the compression algorithm.

16. The computer system of claim 15, wherein the processing device is further configured to:
in response to instructions stored in firmware:
 access the first portion of the hibernation information stored in the non-volatile memory; and
 store the first information in the operational memory based on the first portion of the hibernation information; and
in response to instructions contained within the first information:
 access the second portion of the hibernation information stored in the non-volatile memory; and
 store the second information in the operational memory based on the second portion of the hibernation information.

17. The computer system of claim 15, wherein the processing device is further configured to decompress at least one of the first information and the second information with at least one decompression algorithm selected based on the at least one value identifying the at least one parameter of the at least one compression algorithm.

18. The computer system of claim 15, wherein the processing device is further configured to:
compress the first information with a first compression algorithm;
compress the second information with a second compression algorithm; and
dynamically select the second compression algorithm based on disk read speed and capabilities of the computing environment available to decompress the second portion while restoring the second information in the operational memory.

19. The computer system of claim 18, wherein the processing device is further configured to:
prior to restoring the second information in the operational memory based on the second portion of the hibernation information, decompress the second information with a second decompression algorithm selected based on a second value identifying at least one second parameter of the second compression algorithm.

20. The computer system of claim 15, wherein the processing device is further configured to:
read segments of the second portion from the non-volatile memory using synchronous input/output operations; and
buffer the segments.

* * * * *